H. PEARCE, T. R. G. PARKER & F. W. WRIGHT.
TRIP MECHANISM OF TWO-REVOLUTION PRINTING PRESSES.
APPLICATION FILED JULY 22, 1912.

1,106,402.

Patented Aug. 11, 1914.
5 SHEETS—SHEET 2.

UNITED STATES PATENT OFFICE.

HERBERT PEARCE, THOMAS ROBERT GILLETT PARKER, AND FRED WESLEY WRIGHT, OF BROADHEATH, ENGLAND, ASSIGNORS TO LINOTYPE AND MACHINERY LIMITED, OF LONDON, ENGLAND.

TRIP MECHANISM OF TWO-REVOLUTION PRINTING-PRESSES.

1,106,402.     Specification of Letters Patent.     Patented Aug. 11, 1914.

Application filed July 22, 1912. Serial No. 710,882.

*To all whom it may concern:*

Be it known that we, HERBERT PEARCE, THOMAS ROBERT GILLETT PARKER, and FRED WESLEY WRIGHT, subjects of the King of the United Kingdom of Great Britain and Ireland, and residing at Linotype and Machinery Works, Broadheath, in the county of Chester, England, have invented new and useful Improvements in the Trip Mechanism of Two-Revolution Printing-Presses, of which the following is a specification.

The present invention consists of improvements in the mechanisms for tripping the impression cylinder, and the inking rollers for the form or plate cylinder, of a two revolution printing press. These improvements have been invented for use in an offset press, the form or plate cylinder of which makes one revolution for two in each of the other cylinders—offset and impression, and, for that reason, the nature of them will be best understood from a description of them from that point of view.

The accompanying figures illustrate a preferred constructional form of the invention.

In them, Figures 1 and 1ª together form a side elevation from the feeder side of the press.

For the reason that the press is a two revolution one, the impression cylinder 1 must be alternately and automatically untripped and tripped from and to the cylinder from which it receives its impression, viz:—the offset cylinder 2. The form or plate cylinder 3 is not tripped or untripped during each cycle of the press, but remains in operative contact with the offset cylinder 2 throughout. It carries a cam groove 4 which rocks a double armed lever 5 fulcrumed at 6 on a side frame of the press, to and fro once for each of its revolutions. The outer end of the lever 5 carries a quadrant gear 8 which engages with a segment gear 9 and having two abutments 10, 11, on its periphery. The gear 9 is loose on a transverse rock shaft 12 supported in suitable bearings, say, in the side frames of the press. The shaft 12 has an arm 13 fast on it, on the outer end of which there is pivoted a pawl 14 the nose of which is normally held in contact with the gear by a spring 15 pulling on it from a relatively fixed hook 16. The nose of the pawl 14 and a shoulder 17 on the arm 13 then stand in the arcual recess between the two abutments 10, 11, one of which engages the nose, and the other, the shoulder 17 on the arm 13, these engagements being alternate, and as the pawl 14 is on the arm 13 and held in contact with the abutment 10 on the periphery of the gear 9 by the spring 15, and the arm 13 is fast to the shaft 12, the latter is rocked in harmony with the lever 5. Each end of the said shaft 12 has an arm 18 fast to it, the outer end of which is connected by a connecting rod 19 to an arm 20 fast to an eccentric journal 21 at the respective end of the impression cylinder 1, the effect being that the latter is alternately untripped and tripped by and during each revolution of the form or plate cylinder 3. It should be borne in mind that this tripping must be effected at the poper moment and for the necessary period to prevent coöperation of the members of the printing couple during each revolution of the form or plate cylinder 3.

The cylinder 3 has a diameter twice that of the one common to the cylinders 1 and 2 and the axes of these three cylinders are situated in three different vertical planes, that containing the axis of the impression cylinder 1 being between those of the other two cylinders 2 and 3. Neither of these two features—respective diameters and situation of axes—constitute *per se* part of the present invention.

Figure 1:
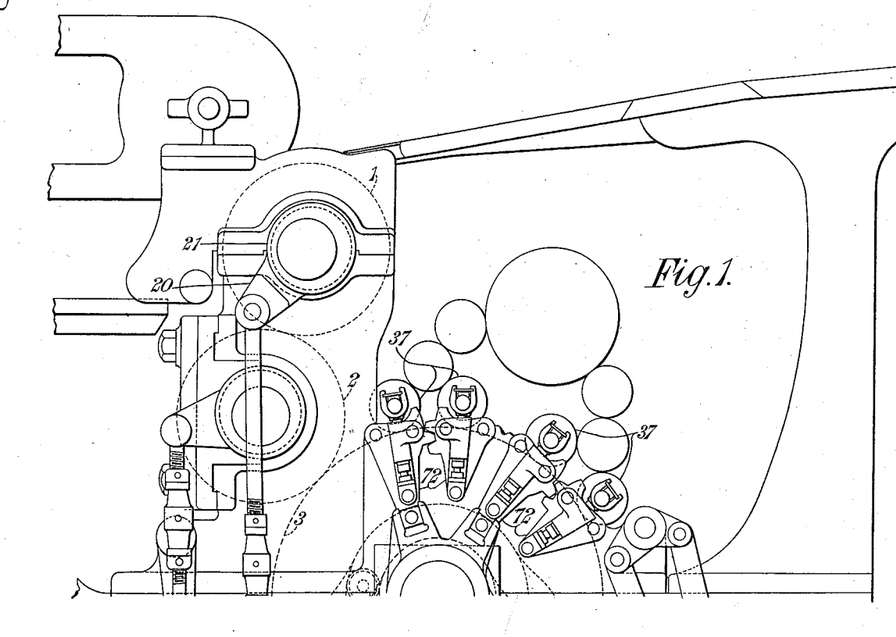
Figure 1A:
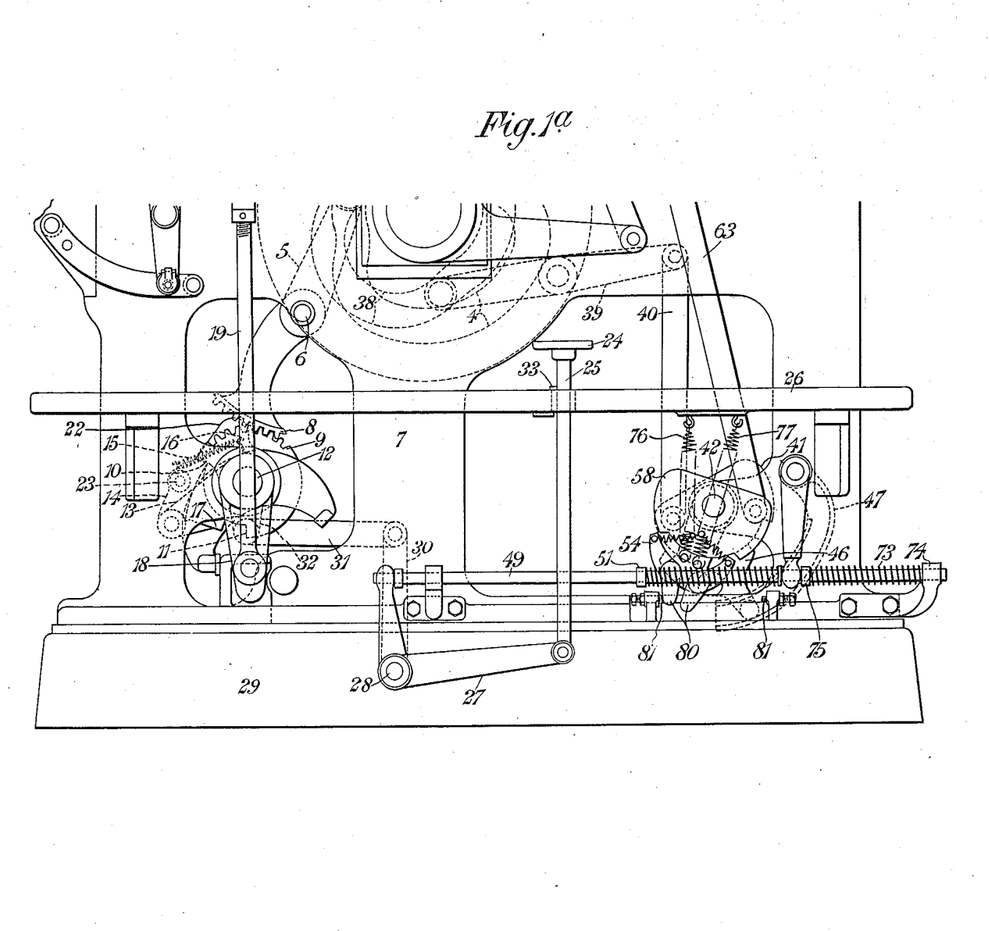

The invention includes non-automatic means for occasionally tripping the impression cylinder of a two revolution press and leaving it tripped for any desired term. These means are as follows: 22 is a cam loose on the transverse shaft 12 and 23, a shoulder, *e. g.*, a roller, on the pawl 14, with which shoulder the cam 22 can engage. The cam 22 is turned about the shaft 12 far enough to rock the pawl 14 out of the path of the untripping abutment 10 on the segment gear 9 by means of a pedal 24 presented by a rod 25 above the footboard 26, the bottom end of the said rod being connected to the cam 22 through one arm of a bell-crank lever 27 fast on a shaft 28 mounted in the base 29 of the press, an arm 30 fast on the opposite end of the shaft 28, and a link 31 from the outer end of this arm 30 to the outer end of an arm 32 fast to and depending from the said cam 22. The depression of the pedal 24 causes the cam 22 to engage with the shoulder 23 on the pawl 14, thereby rocking the nose of the latter out of the path of the untripping abutment 10, in which position it is held by a pin 33 on the rod 25 engaging with the underside of the footboard 26. The pedal 24 is held depressed by the engagement of the usual locking pin on the rod 25 with the usual locking plate on the underside of the footboard 26. The hole in the latter through which the said rod passes is large enough (as indicated by dotted lines in Fig. 1) to permit of both engagement and release as heretofore. When the pedal 24 is released, a spring 15 returns the nose of the pawl 14 into the said path, the pedal 24 and connected parts being returned by springs (hereinafter described) which were compressed by the lever 27.

Figure 2:
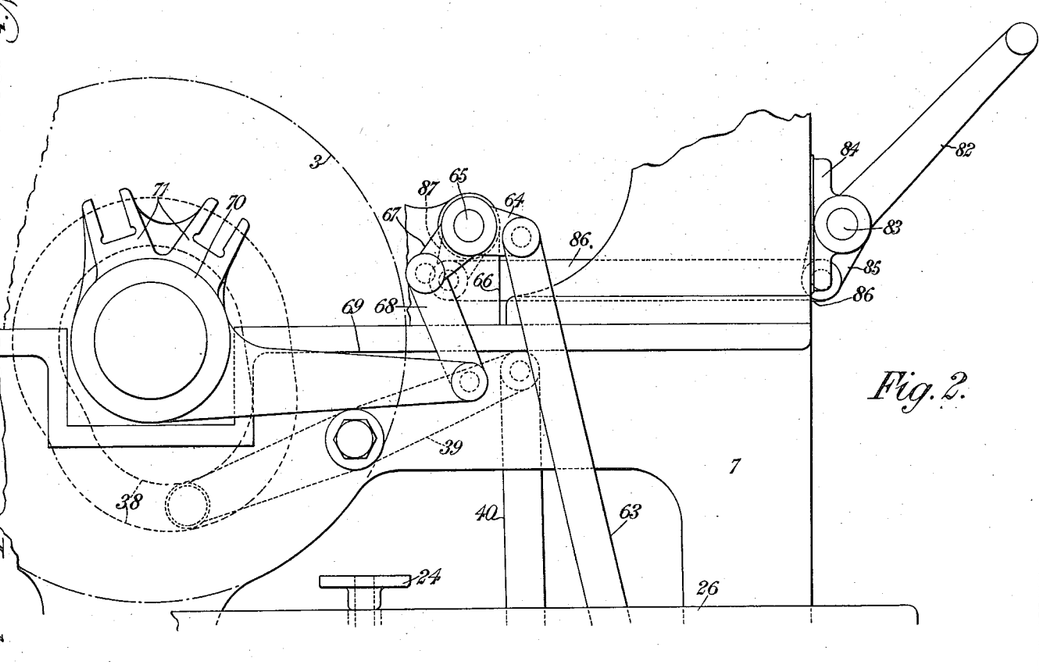
Figs. 2 and 2ª together form an enlargement of the right hand half of Fig. 1.
Figure 2A:
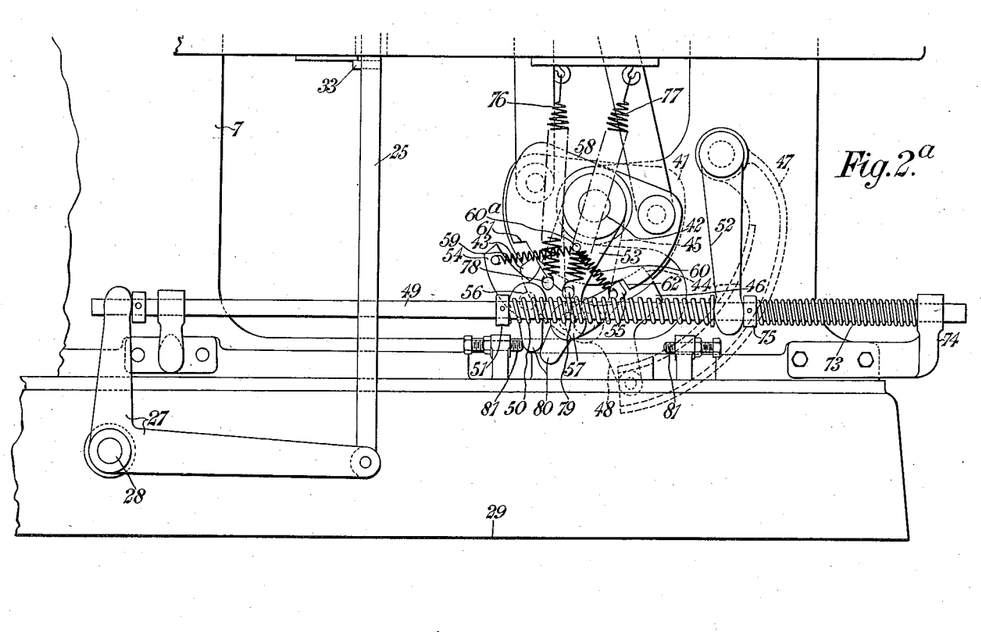
Figure 3:
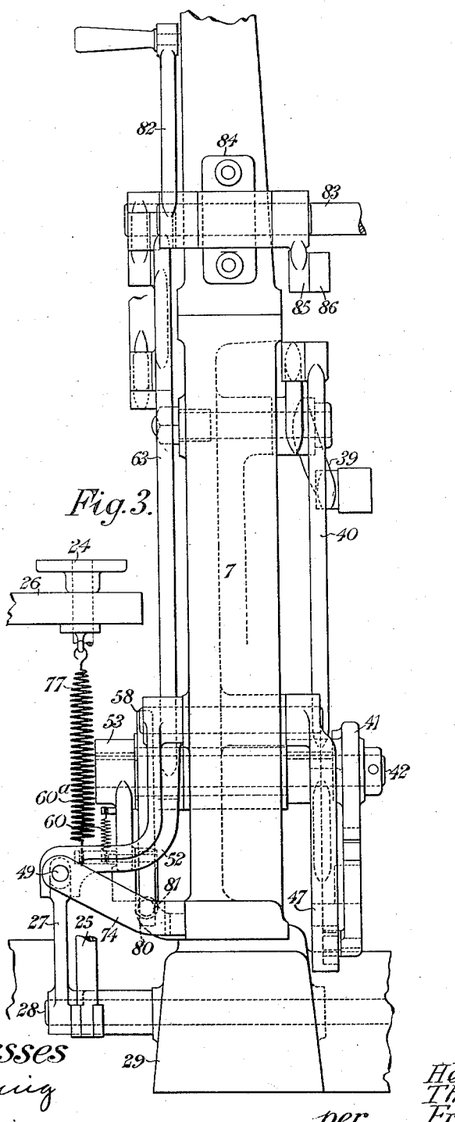
Fig. 3 is an end elevation looking at Fig. 2 from the right.

The invention also includes the combination with the foregoing, of improved automatic means controlled by the feeder, for occasionally tripping the inking rollers 37. These means are especially applicable to a two revolution press because with the present invention, it is desirable that the impression cylinder 1 and the inking rollers 37 should be tripped at different times, the said cylinder being tripped before the inking rollers. It is obvious that the form or plate cylinder 3 will be improperly (imperfectly or partially) inked and the offset cylinder 2 likewise, if the inking rollers 37 do not make and break contact with the cylinder 3 at the proper moment. The object of this part of the invention is to secure one complete inking for each impression. Let it be supposed that the feeder notices that the sheet in his hands is torn. As a matter of course, he trips the impression cylinder 1, say, by depressing the pedal 24, which thereupon effects the desired tripping as, and through the means, just described. But the act of inking then proceeding, may be allowed to complete itself on the offset cylinder 2 (if the press is an offset one) because it will do for the next sheet. But for that very reason, the inking rollers 37 must be tripped as soon as the said act of inking is completed, otherwise the offset cylinder 2 would be double inked. The automatic means to effect this are as follows. At the moment that the act of inking just mentioned is completed, the following mechanism (shown best in Fig. 2) and which is a preferred constructional form of this part of the invention, comes into operation. A cam groove 38 on one end of the form or plate cylinder 3 (and therefore constantly rotating) depresses a double arm lever 39 fulcrumed on the respective side frame. The opposite end of the lever 39 is connected by a link 40 to a semi-circular pawl plate 41 loose at the feeder side of the press, on a transverse rock shaft 42 turning in suitable bearings. This plate 41 has an arcual recess in its semi-circular periphery establishing two shoulders 43, 44. There is an arm 45 fast on the shaft 42, having pivoted on its outer end, a double pawl 46 the noses of which are adapted to engage with the said shoulders 43, 44, alternately, according to the direction in which it (the pawl 46) is rocked on its pivot. It is rocked by an eccentric grooved arm 47 engaging a roller on an arm 48 projecting in a suitable direction for the purpose, from the pawl 46, the rocking motion being communicated to the grooved arm 47 from the pedal 24 through the bell-crank lever 27, a horizontal push rod 49, and a coil spring 50 surrounding this rod 49 and compressible between a collar 51 fast on it and an arm 52 axially fast to the grooved arm 47. Let it be remembered that the feeder wants to trip the inking rollers 37. He depresses the pedal 24, and this, acting through the connections described, rocks the left hand nose of the double pawl 46 into the recess in the pawl plate 41 and, therefore, into the path of its left hand shoulder 43, and as the cam 38 lifts its end of the double arm lever 39, the said shoulder 43 is turned downward through a corresponding arc, taking the pawl plate 41 and pawl 46 with it, and, as the arm 45 which carries the pawl 46, is fast to the transverse shaft 42, this latter is turned likewise. On an arm 53 fast to the outer end of the same shaft 42, are pivoted two pawls 54, 55, one on each side of the median line of the said arm and at 56, 57, close to its outer end. The shaft 42 has a second pawl plate 58 of the same shape as the one, 41, already described, and which is mounted on the said shaft in the same way. The pawls 54, 55, are urged by respective springs 59, 60, both pulling from the same point 60ᵃ on the median line above mentioned, into contact with the pawl plate 58 between the shoulders 61, 62, on it. The turning of the shaft 42 makes the right hand pawl 55, engage the respective shoulder 62 on the pawl plate 58 and turn it, thereby, through suitable link and lever connections, actuating the particular device, cam or otherwise, that trips the inking rollers 37 in respect of the form or plate cylinder 3. The connections illustrated, consist of a link 63 from the pawl plate 58 to an arm 64 fast on a transverse rock shaft 65 mounted in bearings 66 on the side frames of the press, an arm 67 fast to each end of the shaft 65 and connected by a link 68 to an arm 69 fast to and projecting toward the said connections, from a ring 70 carrying slotted arms 71 which directly actuate the supporting plates 72 of the inking rollers 37. The combination of the parts 69, 70, and 71 may be regarded as the inking mechanism trip proper. The combination with the supporting plates 72 and the inking rollers of the parts 65 to 71 forms, *per se* no part of the prseent invention but of the one described in the specification of Letters Patent of the United States of America 1060624, May 6th, 1913, on an invention entitled Means for tripping the inking rollers of printing presses. The rollers 37 are untripped (put into contact with the form or plate cylinder 3), and at the proper moment too (thereby preventing imperfect inking), by a spring, say, a coiled one 73 on the push rod 49 above mentioned, so positioned, as between an abutment 74 on the base 29 and a collar 75 on the rod 49, as to act on the arm 52 fast to the grooved arm 47, in opposition to the coiled spring 50 first mentioned. As soon as it is free to do so, this second spring 73 reverses the grooved arm 47, thereby making it put the right hand nose of the double pawl 46 into the path of the right hand shoulder on the first pawl plate 41, which shoulder will, by the set of the cam 38 on the cylinder 3, engage and push the double pawl 46 before it soon enough to effect the untripping in time. The transverse shaft 42 has, thus, two terminal positions, and it must be held in the one into which it is, from time to time, turned. This holding is effected, preferably, by the following means: There are two spiral springs 76, 77, pulling from an independent fixed point, *e. g.*, the footboard 26, upon the outer end of the arm 53 that carries the pair of pawls 54, 55, the points of connection 78, 79, to the said end being so arranged that when the shaft 42 is in the desired position, one spring is holding it there, the other being inoperative for the reason that it is then pulling through a dead center. Each of the pawls 54, 55, is disengaged from the respective shoulder 61, 62, by the engagement of a radial toe 80 fast on it with an independent abutment 81 adjustable on the base 29.

The present invention further includes manual means independent of the automatic means just described for untripping and tripping the inking rollers 37. For the reason that the right or left hand pawl 54 or 55, is forced out of engagement with its co-operating shoulder 61 or 62, as the case may be, on the pawl plate 58 when the arm 53 that carries the said pawls, has reached its respective terminal position, the said pawl plate being also loose on its shaft 42, the movement of that pawl plate (58) may be effected by some independent means regardless of the extreme position to right or left, which the arm 53 may, at any given moment, occupy. Thus the inking rollers 37 may be lowered into contact with the cylinder 3 (*i. e.*, untripped) during the time that the pedal 24 is down, the impression cylinder being consequently, then in the tripped position, or the said rollers may be lifted out of contact with the cylinder 3 (*i. e.*, tripped) during the time that the pedal 24 is not down, the cylinder 1 being consequently, then in the untripped position. This independent untripping and tripping of the said rollers 37, is effected by a hand lever 82 fast on the feeder side end of a transverse rock shaft 83 turning in a bearing 84 on the side frame of the press and having an arm 85 fast to the inner end of it, the said arm 85 being connected by a link 86 to an arm 87 fast to the shaft 65 already described, and through it and the connected parts, to the rollers 37. The combination of the parts 82 to 87 with the shaft 65 and through it with the rollers 37, forms, *per se*, no part of the present invention, but of the one described in the specification of the application of even date already referred to.

Having described our invention, we declare that what we claim and desire to secure by Letters Patent is:—

1. In a two revolution printing press, the combination with its impression cylinder, of a lever reciprocated by the form or plate cylinder; a quadrant gear on an arm of the said lever; a gear loose on a shaft independent of both the said cylinders, engaged by the said quadrant gear and having two abutments; operative connections from the said loose gear to the impression cylinder by which each reciprocation of the quadrant gear, trips and untrips the same; an arm fast to the said shaft; an arcual recess in the loose gear between its abutments and a pawl and shoulder adapted by being operatively located on opposite sides of the last mentioned arm and in contact with the said recess to be alternately engaged by the respective abutment.

2. In a two revolution printing press, the combination with its impression cylinder, of a lever reciprocated by its form or plate cylinder; a quadrant gear on an arm of the said lever; a gear loose on a shaft independent of both the said cylinders, engaged by the said quadrant gear and having two abutments; operative connections from the said loose gear to the impression cylinder by which each reciprocation of the said quadrant gear, trips and untrips the same; an arm fast to the said shaft; an arcual recess in the loose gear between its abutments; a pawl and shoulder adapted by being operatively located on opposite sides of the last mentioned arm and in contact with the said recess to be alternately engaged by the respective abutment; a device loose on the said shaft; a foot pedal; and means operatively connecting the said pedal to the device whereby the actuation of the pedal turns the device about the shaft far enough to engage with the said pawl and hold it out of the path of the operating abutment.

3. In a two revolution printing press, the combination with its impression cylinder, of a lever reciprocated by its form or plate cylinder; a quadrant gear on an arm of the said lever; a gear loose on a shaft independent of both the said cylinders, engaged with the said quadrant gear and having two abutments; operative connections from the loose gear to the impression cylinder adapted to make each reciprocation of the said quadrant gear, trip and untrip that cylinder; an arm fast to the said shaft; an arcual recess in the loose gear between its abutments; a pawl and shoulder adapted by being operatively located on opposite sides of the last mentioned arm and in contact with the said recess, to be alternatively engaged by the respective abutment; a foot pedal; means adapted by being operatively connected to both the said pedal and device to turn the latter about the shaft thereby making it engage the said pawl and hold it out of the path of its actuating abutment; and automatic means for returning both pedal and pawl to their normal positions after the pedal has been released.

4. In a two revolution printing press, the combination with its impression cylinder, of a lever reciprocated by its form or plate cylinder; a quadrant gear on an arm of the said lever; a gear loose on a shaft independent of both the said cylinders, engaged with the said quadrant gear and having two abutments; operative connections from the loose gear to the impression cylinder adapted to make each reciprocation of the quadrant gear, trip and untrip that cylinder; an arm fast to the said shaft; an arcual recess in the loose gear between its abutments; a pawl and shoulder adapted by being operatively located on opposite sides of the last mentioned arm and in contact with the said recess, to be alternatively engaged by the respective abutment; a cam loosely mounted on the said shaft; a foot pedal; a pedal rod; a locking device adapted to lock and release the pedal; a bell crank lever and link connecting the pedal rod and cam; a shoulder on the said pawl and a spring holding the said shoulder in the path of the cam.

5. In a two revolution press in which the form or plate cylinder is in operative contact with its coöperating cylinder throughout each cycle of the press, and in which the impression cylinder makes two revolutions per impression, the combination with the impression cylinder and inking rollers, of automatic means for tripping and untripping the last mentioned cylinder, means under the control of an attendant for occasionally tripping the same cylinder and leaving it tripped for any desired term, and automatic means controllable by an attendant for tripping the inking rollers.

6. In a two revolution press in which the form or plate cylinder is in operative contact with its coöperating cylinder throughout each cycle of the press, and in which the impression cylinder makes two revolutions per impression, the combination with its impression cylinder and inking rollers, of automatic means for tripping and untripping the last mentioned cylinder, means under the control of an attendant for occasionally tripping the same cylinder and leaving it tripped for any desired term, automatic means for returning the said means to their normal position, and automatic means under the control of an attendant for tripping the inking rollers.

7. In a two revolution offset printing press in which the form or plate cylinder is in operative contact with the offset cylinder throughout each cycle of the press, and in which the impression and offset cylinders make two revolutions per impression, the combination of the form or plate cylinder, a cam thereon, inking rollers, an inking roller trip proper, automatic means for reciprocating said trip comprising a shaft, two pawl plates loose thereon and having oppositely placed abutments, means actuated by the cam on the plate or form cylinder to rock one pawl plate, means actuated by the other pawl plate to actuate the trip proper, a double pawl on an arm fast on the said shaft and adapted to be put into engagement with either of the abutments on the said one pawl plate to communicate the angular motion of the latter to the shaft, a second arm fast on the said shaft, and two pawls symmetrically arranged on the said second arm, each pawl being adapted to be engaged with the respective abutments on the other pawl plate to communicate its angular motion to the latter.

8. In a two revolution offset printing press in which the form or plate cylinder is in operative contact with the offset cylinder throughout each cycle of the press, and in which the impression and offset cylinders make two revolutions per impression, the combination of the form or plate cylinder, a cam groove thereon, inking rollers, an inking roller trip proper, automatic means for reciprocating the said trip, operated by the cam groove, an independently fulcrumed lever rocked by said cam groove, a pawl plate having two abutments and loose upon a shaft, a link connecting the said lever and pawl plate, a double pawl pivoted on an arm fast to the said shaft to engage with the said abutments alternately, a rocking cam groove engaging the said pawl to make it engage with and disengage from the said pawl plate, a pedal, a pedal rod, bell crank lever, push rod, spring, and an arm connected to the said rocking cam groove to operate it, a second arm fast on the said shaft and carrying two pawls, a second pawl plate loose on the said shaft and likewise having abutments, springs on the second arm pulling both pawls into engagement with the second pawl plate, toes on the pawls to alternately engage with the abutments to reverse the engagement obtaining for the time being, and link and lever mechanism connecting the second pawl plate to the particular device that moves the inking rollers.

9. In a two revolution offset printing press in which the form or plate cylinder is in operative contact with the offset cylinder throughout each cycle of the press, and in which the impression and offset cylinders make two revolutions per impression, the combination with the inking rollers and an inking roller trip proper, of automatic means for tripping the impression cylinder, automatic means controlled by the feeder for tripping the inking rollers, and a manual lever mechanism for directly actuating the inking roller trip proper.

10. The combination in a printing press having an impression cylinder, inking rollers, and an inking roller trip proper, of a manual lever mechanism for directly actuating the inking roller trip proper; automatic means for tripping and untripping the impression cylinder; means under the control of an attendant for occasionally tripping the same cylinder and leaving it tripped for any desired term; automatic means for returning the said means to their normal position; and automatic means under the control of the attendant for tripping the inking rollers.

11. In a two revolution offset printing press in which the form or plate cylinder is in operative contact with the offset cylinder throughout each cycle of the press, and in which the impression and offset cylinders make two revolutions per impression, the combination of the form or plate cylinder, a cam thereon, inking rollers, an inking roller trip proper, a manual lever mechanism for directly actuating the inking roller trip proper, automatic means for reciprocating the said trip comprising a shaft, two pawl plates loose thereon and having oppositely placed abutments, means actuated by a cam on the plate or form cylinder to rock one pawl plate, means actuated by the other pawl plate to actuate the trip proper, a double pawl on an arm fast on the said shaft and adapted to be put into engagement with either of the abutments on the said one pawl plate to communicate the angular motion of the latter to the shaft, and two pawls symmetrically arranged on a second arm fast to the said shaft, each adapted to be engaged with the respective abutments on the other pawl to communicate its angular motion to the latter.

12. In a two revolution offset printing press in which the form or plate cylinder is in operative contact with the offset cylinder throughout each cycle of the press, and in which the impression and offset cylinders make two revolutions per impression, the combination of the form or plate cylinder, a cam groove therein, inking rollers, an inking roller trip proper, a manual lever mechanism for directly actuating the inking roller trip proper, automatic means for reciprocating the said trip consisting of the cam groove on the plate or form cylinder, an independently fulcrumed lever rocked by said cam groove, a pawl plate having two abutments and loose upon a shaft, a link connecting the said lever and pawl plate, a double pawl pivoted on an arm fast to the said shaft to engage with the said abutments alternately, a rocking cam groove engaging the said pawl to make it engage with and disengage from the said pawl plate; a pedal, a pedal rod, a bell crank lever, a push rod, a spring, an arm axially fast to the said rocking cam groove to rock it, a second arm fast on the said shaft and carrying two pawls, a second pawl plate loose on the said shaft and likewise having abutments, springs on the second arm pulling both pawls into engagement with the second pawl plate, toes on the pawls to alternately engage with the abutments to reverse the engagement obtaining for the time being, and link and lever mechanism connecting the second pawl plate with the particular device that moves the inking rollers.

13. In a two revolution offset printing press in which the form or plate cylinder is in operative contact with the offset cylinder throughout each cycle of the press, and in which the impression and offset cylinders make two revolutions per impression, the combination with the inking rollers and an inking roller trip proper, of means independent of those for tripping the impression cylinder for tripping and untripping the inking rollers at the respectively proper moments, and for keeping it tripped or untripped for the proper periods to prevent imperfect or partial inking of the form or plate.

14. In a two revolution offset printing press in which the form or plate cylinder is in operative contact with the offset cylinder throughout each cycle of the press, and in which the impression and offset cylinders make two revolutions per impression, the combination with the inking rollers and an inking roller trip proper, of automatic means under the control of an attendant and independent of the means for tripping the impression cylinder, said automatic means adapted to trip and untrip the inking rollers at the respectively proper moments, and for keeping it tripped or untripped for the proper periods for preventing imperfect or partial inking of the forms or plate.

In witness whereof we have hereunto set our hands in the presence of two witnesses.

HERBERT PEARCE.
THOMAS ROBERT GILLETT PARKER.
FRED WESLEY WRIGHT.

Witnesses:
WILLIAM EDWARD BENNISON,
JOSEPH LAMB.